May 12, 1925.
H. H. WOLFE
UNIVERSAL JOINT
Filed May 6, 1922
1,537,279
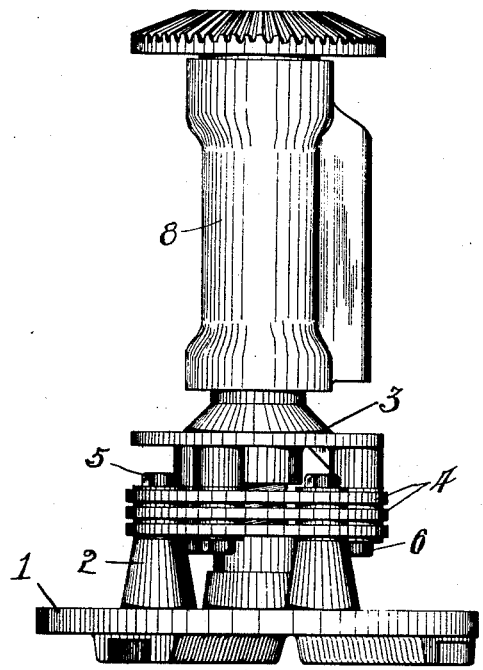
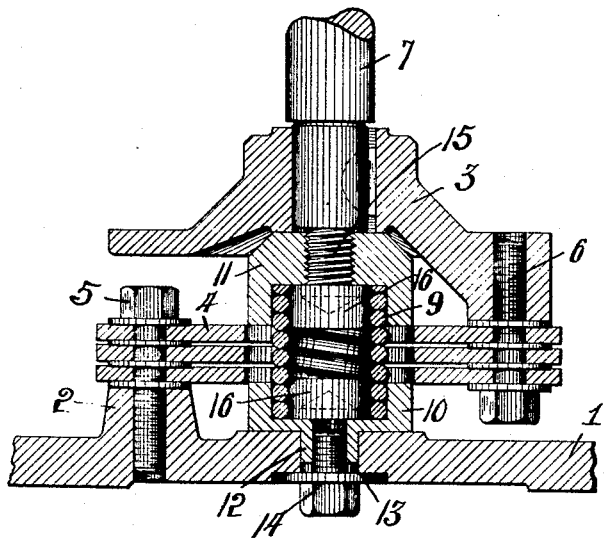

Patented May 12, 1925.

1,537,279

UNITED STATES PATENT OFFICE.

HARRY H. WOLFE, OF TOLEDO, OHIO, ASSIGNOR TO THE AMERICAN FLOOR SURFACING MACHINE COMPANY, OF TOLEDO, OHIO, A CORPORATION OF OHIO.

UNIVERSAL JOINT.

Application filed May 6, 1922. Serial No. 558,872.

*To all whom it may concern:*

Be it known that I, HARRY H. WOLFE, a citizen of the United States, and a resident of Toledo, in the county of Lucas and State of Ohio, have made an Invention Appertaining to a Universal Joint; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to universal joints and particularly to a joint of this character adapted for use in floor surfacing machines between the rotary abrading block carrying head and its driving element.

The object of the invention is the provision of a simple and inexpensive joint of this character which is composed of comparatively few parts, is highly efficient in its operation and is adapted to normally retain the connected parts in axially aligned relation.

The invention is fully described in the following specification, and while in its broader aspect it is capable of embodiment in numerous forms, a preferred embodiment thereof is illustrated in the accompanying drawings, in which,—

Fig. 1 is a side elevation of a portion of a floor surfacing machine embodying the invention, and Fig. 2 is an enlarged fragmentary central vertical section thereof with the shaft bearing removed.

Referring to the drawings, 1 designates a rotary head adapted to carry at its under side one or more abrading blocks (not shown) in any suitable manner and being provided on its top or inner side with a circular series of spaced bosses 2 arranged concentrically around its center. The head is connected for relative universal rocking movements, to a spider 3 by means of one or more pliable rings 4 of any suitable material of a strong and durable nature, such for instance as rubber impregnated fabric, canvas, leather, "thermoid," "balata" etc. The rings are fixedly connected to the bosses 2 by screws 5, or in any other suitable manner, and are similarly fixed to the spider 3 at points intermediate the bosses 5 by screws 6, thus causing the head and spider to rotate together but permitting relative universal rocking movements thereof, as well understood in the art. The spider 3 is fixed to the lower end of a shaft 7 mounted in a carrying bearing 8 forming a part of the associated machine.

The feature of the joint in which my invention particularly resides consists in connecting the head 1 and spider 3 centrally thereof through the openings of the pliant rings 4 by a closely coiled spring 9, which provides an efficient flexible thrust member between said parts. The spring has its ends fixed to cup-like members 10 and 11, which are respectively fixed to the adjacent sides of the head and spider in axial register with each other and to the parts with which secured. The member 10 is provided centrally at its outer end with an internally threaded tubular part 12, which fits into a central opening 13 in the head 1, and a screw 14 is threaded into the part 12 and coacts with the outer side of the head to retain the parts in rigid assembled relation. The member 11 is provided at its outer end with a centrally disposed threaded opening into which a stud 15, projecting axially from the lower end of the shaft 7, is threaded. A plug 16 is forcefully positioned in each end of the spring 9 and cooperates with the opposed spring enclosing wall of the respective member 10 or 11 to effectually bind the spring to the member so that the spring and members are rigidly connected. To facilitate such binding action it is preferable to highly heat the members 10 and 11 before inserting the plugs 16 in the ends of the spring 9, so that when the members are cooled the resultant contraction thereof will effect a firm and rigid gripping of the adjusted spring ends between the plugs 16 and members.

The spring 9, which has its coils closely disposed so that one seats on another, acts as a thrust member between the head 1 and spider 3 and is unyielding axially thereof and at the same time is laterally flexible to permit a yielding universal rocking of the head.

It is evident that the connection between the head 1 and spider 3 through the interposed flexible rings 4 and screws 5 serves to yieldingly retain the head and spider in assembled relation for relative universal rocking movements, and that the spring 9 acts as the thrust member between the head and spider and also serves as a pliant connecting means for assisting in retaining the head and spider in assembled relation. It is found in practice that this forms a very efficient flexible connection between the abrading block carrying head and operating shaft of a floor surfacing machine and obviates objections which are incident to the use of other forms of flexible joints.

I wish it understood that my invention is not limited to any specific construction, arrangement or form of the parts as it is capable of embodiment in numerous forms without departing from the spirit of the claims.

Having thus described my invention, what I claim as new and desire to secure by Letters Patent, is,—

1. In combination with a rotary abrading block carrying head, a pair of spaced opposed members one of which is connected to the head and each having a circular series of inwardly extending bosses, the bosses of the two series being arranged in alternating order, a pliable ring-like driving device engaged on its opposite side faces with the two series of bosses and being secured to each, inwardly extending cups secured to the opposed members and being disposed in spaced confronting relation and alined with the open center of the ring device, an end thrust-receiving coil spring engaged at its ends in the cups and plugs frictionally engaged with the inner circumference of the spring ends to hold the latter in the cups, the spring extending through the open center of the ring-like device and being spaced therefrom so as to permit transverse movement of the device without engaging the spring.

2. In combination with a rotary abrading block carrying head, a pair of spaced opposed members one of which is connected to the head, a pliable ring-like driving device interposed between and secured to said members, an independently acting end thrust-receiving coil spring extending through the open center of the driving device and means to secure the ends of the spring to the respective members.

3. In combination with a rotary abrading block carrying head, a pair of spaced opposed members one of which is connected to the head, a pliable ring-like driving device interposed between and secured to said members, an independently acting end thrust-receiving coil spring extending through the open center of the driving device and being spaced from the open center of the driving device, and means to connect the ends of the spring to the respective members.

In testimony whereof I have hereunto subscribed my name to this specification.

HARRY H. WOLFE.